Aug. 31, 1926.
A. CROOK
1,598,244
VALVE
Filed April 26, 1926   2 Sheets-Sheet 1
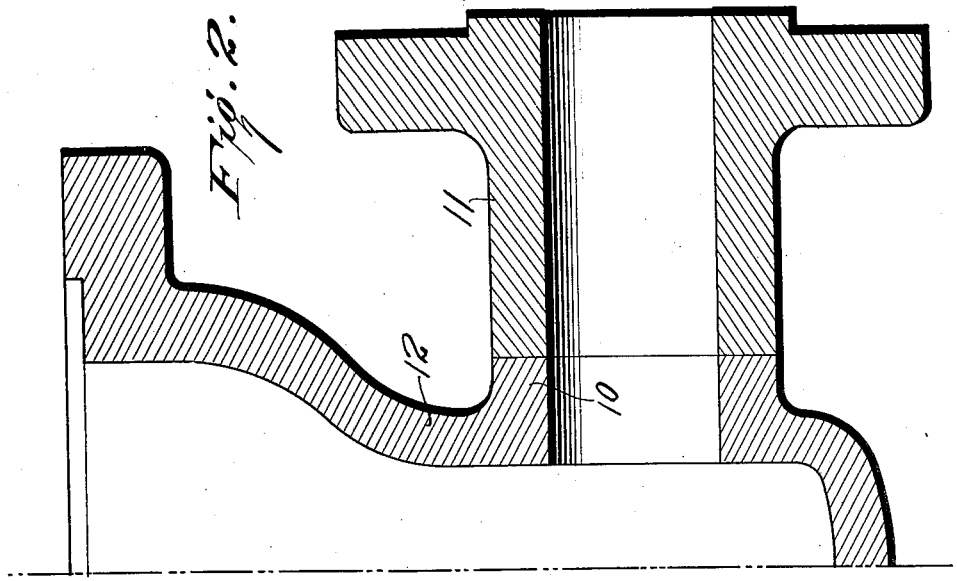
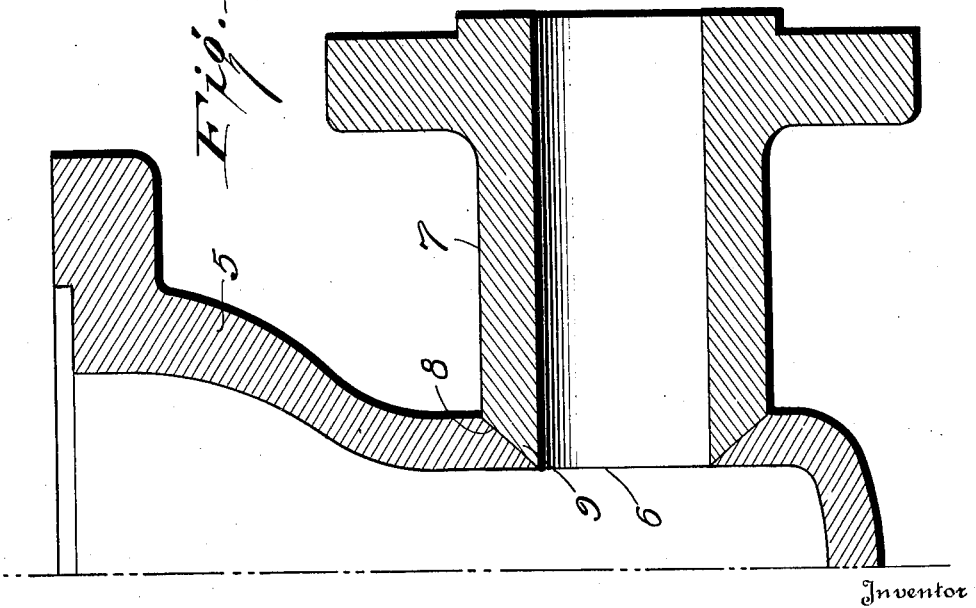
Inventor
ALFRED CROOK,
By Jac A. Richmond
Attorney Aug. 31, 1926. 1,598,244
A. CROOK
VALVE
Filed April 26, 1926 2 Sheets-Sheet 2
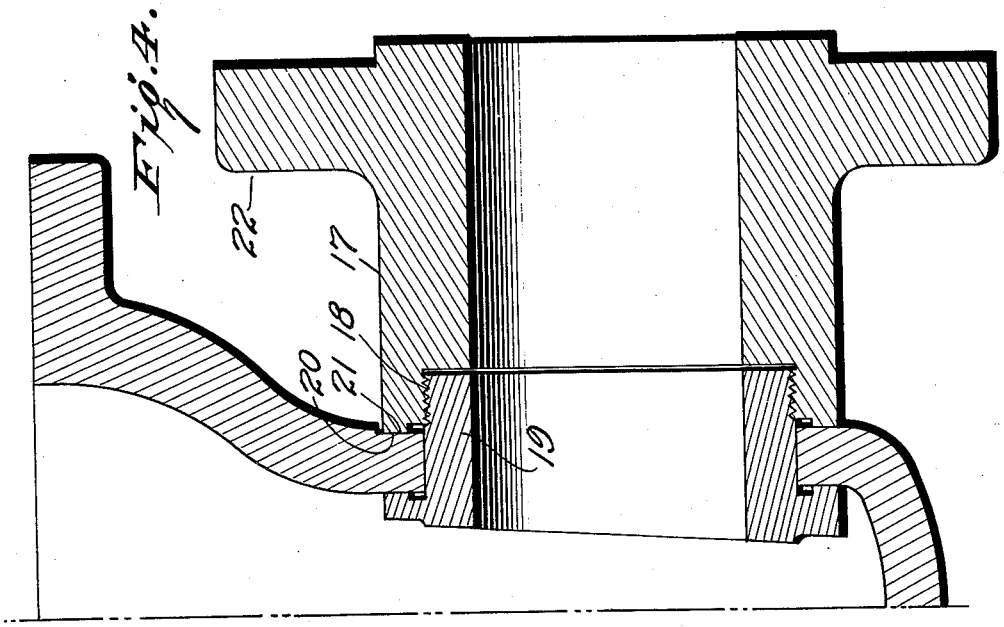
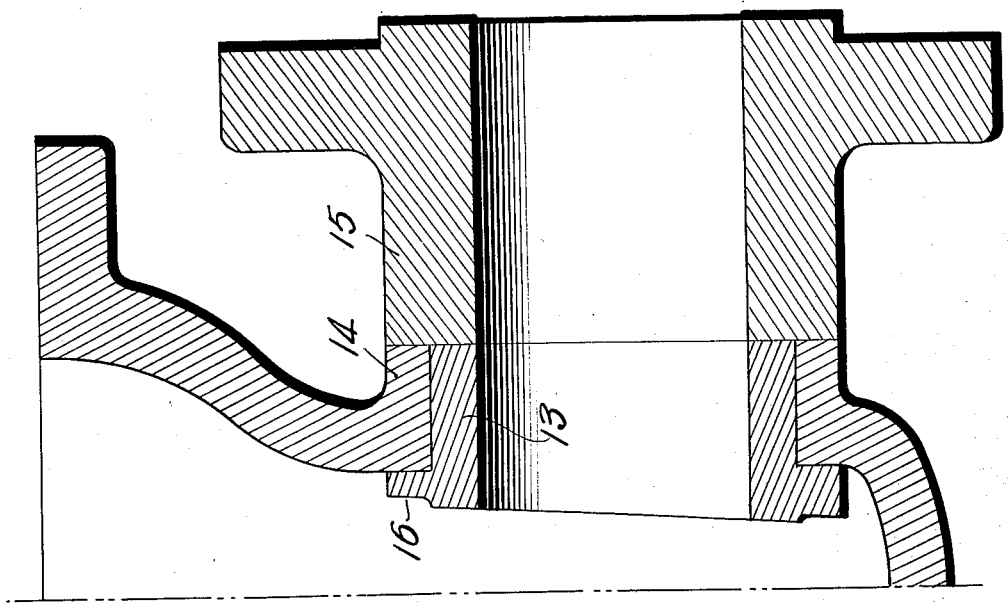
Inventor
ALFRED CROOK,
By Jas. T. Richmond
Attorney Patented Aug. 31, 1926.

1,598,244

UNITED STATES PATENT OFFICE.

ALFRED CROOK, OF PHILADELPHIA, PENNSYLVANIA, ASSIGNOR TO TIOGA STEEL AND IRON COMPANY, OF PHILADELPHIA, PENNSYLVANIA, A CORPORATION OF PENNSYLVANIA.

VALVE.

Application filed April 26, 1926. Serial No. 104,723.

My invention relates to valve bodies intended for operations under high temperature and high pressure conditions such as, for example, superheated steam lines, high pressure power plants, oil cracking operations and drilling operations.

For heavy duty operations of the kind indicated, cast iron and cast steel valves are unsatisfactory and it has been proposed to substitute forged valve bodies. One such proposal contemplated forging the body complete, internally and externally, including hub extensions and flanges. That proposal manifestly is impracticable. Another proposal contemplated forging the exterior of the valve body complete and subsequently shaping the interior by machining. This method is practiced to some extent but is expensive and when the hub extensions are long or require flanged ends they must be secured to the main body forging in some way as separate elements. By far the most efficient design so far proposed both from production as well as service standpoint is the extruded valve body formed with solid side walls which when properly apertured provide a convenient means of mechanically securing the hubs complete with flanges, etc., to the body. But even this construction suffers the disadvantage that, when the valve is trimmed in the usual way and subjected to severe pressure or temperature conditions, there is more or less deflection or distortion of the walls of the valve body or other parts, the effect of which is to strain or open up the mechanical joints and cause leakage long before the ultimate strength of the forged body has been reached.

Now the nature of my invention consists in improving constructions, preferably of the extruded valve body type, in obviating conditions making for the fault or disadvantage stated, by eliminating mechanical joints. In achieving this result it is a merit of the invention that I resort to direct connection, or what may be termed molecular union, of the body and hub members, and it is a further merit that this is accomplished in such way as to buttress the side walls of the body and thus enable them efficiently to resist tendency to abnormal deflection or distortion.

In the annexed drawings, forming a part hereof,

Figure 1 is a sectional view of a valve body constructed in accordance with my invention.

Figs. 2, 3 and 4 are similar views of modifications.

Referring to Figure 1, the numeral 5 represents a valve body of the extruded or solid forged type. I make no claim broadly to the extruded type of valve body except in so far as it enters into the general scheme of my inventive concept as hereinafter set forth.

According to my invention, I pierce the side walls to provide apertures 6 for the application of hub members 7, the walls of the apertures being inclined or beveled as at 8 for a distance that spans the full depth of the body section. Thus there are provided sockets for the hub members, the ends 9 of the latter being tapered to fit the sockets. Thus assembled, the hub members are electrically or fusion welded to the body. The flaring walls of the apertures and the correspondingly tapered ends of the hub members not only provide for a butt weld, which is desirable, but provide for increased area of the weld without impairing the strength of the valve body, and increased area of lateral stiffening or bracing of the body.

In the embodiment shown in Fig. 2, I form the extruded valve body with integral bosses 10 and butt weld the hub members 11 thereto by the electric or fusion welding method. The bosses 10 are of relatively heavier section than the surrounding side walls 12, and serve to stiffen the same.

In the modification, Fig. 3, there is a continuation or carrying forward of the inventive idea illustrated in Fig. 2, manifested by the inclusion of internal bushings or seating rings 13, the outer end faces of which are flush with the end faces of the bosses 14 and abut against the proximate end faces of the hub members 15. The latter are molecularly joined or fusion welded to the end faces of both bosses and seating rings. The seating rings may have an annular lodgment on the inner wall of the valve body as by the inclusion of a collar 16.

Fig. 4 illustrates a modification wherein the hubs 17 have screw-threaded connection, as at 18, with seating rings 19, and the valve body, when necessary, is turned down, as at 20 to provide a plane surface for molecular union with the hubs. For this purpose the ends of the latter are reduced in cross-section by turning an internal shoulder and thus providing for advance contact portions 21. In this embodiment, as in the others, the pipe flanges 22 are formed integral with the hubs, which, by preference, are forgings.

Having described my invention, I claim:

1. A valve body consisting of a forging having side walls of variable section with integral hollow bosses for stiffening the relatively thin wall sections.

2. A valve body consisting of a forging having side walls of variable section with integral bosses for stiffening the relatively thin wall sections, said bosses having fluidways.

3. A valve body consisting of a forging having side walls of variable section with integral bosses for stiffening the relatively thin wall sections, said bosses having fluidways, and hub members butt-welded to the bosses.

4. The method of preventing distortion and leakage of valve bodies, which consists in providing a forged valve body, piercing the side walls to establish a fluidway, and joining fluidway extensions directly to the body.

5. The method of preventing distortion and leakage of valve bodies, which consists in providing a forged valve body, piercing the side walls to establish a fluidway, and buttressing the side walls by molecularly joining fluidway members directly to the body.

6. The method of preventing distortion and leakage of valve bodies, which consists in providing a forged valve body having laterally directed bosses, piercing the bosses to establish a fluidway, and molecularly joining hub members to the bosses.

7. The method of preventing distortion and leakage of valve bodies, which consists in providing a forged valve body having laterally extending reinforcing bosses, piercing said bosses to establish a fluidway, and molecularly joining independently formed hub members to the bosses.

8. The method of preventing distortion and leakage of valve bodies, which consists in providing a forged valve body having side walls of variable section and stiffening bosses in the region of least section, piercing the bosses to establish a fluidway, and molecularly joining hub members to the bosses.

9. The method of preventing distortion and leakage of valve bodies, which consists in providing a forged valve body having side walls of variable section, breaching the side walls to accommodate line connections, and bracing the side walls by direct connection thereof with the line connections.

In testimony whereof I affix my signature.

ALFRED CROOK.